United States Patent
Loew

(10) Patent No.: US 9,435,391 B2
(45) Date of Patent: Sep. 6, 2016

(54) DISC BRAKE FOR A COMMERCIAL VEHICLE

(71) Applicant: KNORR-BREMSE Systeme fuer Nutzfahrzeuge GmbH, Munich (DE)

(72) Inventor: Alfred Loew, Rotthalmuenster (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/595,594

(22) Filed: Jan. 13, 2015

(65) Prior Publication Data

US 2015/0122599 A1  May 7, 2015

Related U.S. Application Data

(63) Continuation of application No. PCT/EP2013/064658, filed on Jul. 11, 2013.

(30) Foreign Application Priority Data

Jul. 13, 2012 (DE) .................. 10 2012 013 957

(51) Int. Cl.
*F16D 55/2265* (2006.01)
*F16D 65/00* (2006.01)
*F16D 55/00* (2006.01)

(52) U.S. Cl.
CPC ..... *F16D 65/0087* (2013.01); *F16D 55/22655* (2013.01); *F16D 65/0068* (2013.01); *F16D 2055/0008* (2013.01); *F16D 2055/0016* (2013.01)

(58) Field of Classification Search
CPC .................. F16D 55/2265; F16D 55/22655; F16D 55/227; F16D 65/0087; F16D 65/0093

USPC ................... 188/73.44, 74.45, 18 A
See application file for complete search history.

(56) References Cited

U.S. PATENT DOCUMENTS

| 4,189,032 A | 2/1980 | Farr |
| 4,280,598 A | 7/1981 | Poellinger |

(Continued)

FOREIGN PATENT DOCUMENTS

| CA | 1 171 003 A | 7/1984 |
| DE | 26 50 767 A1 | 5/1977 |

(Continued)

OTHER PUBLICATIONS

International Preliminary Report on Patentability (PCT/IC/373), including Written Opinion (PCT/ISA/237) dated Jan. 17, 2015 with English-language translation (ten (10) pages).

(Continued)

*Primary Examiner* — Robert A Siconolfi
*Assistant Examiner* — Vu Q Nguyen
(74) *Attorney, Agent, or Firm* — Crowell & Moring LLP

(57) ABSTRACT

A disc brake for a commercial vehicle includes a brake caliper, which surrounds a brake disc and which is retained on a stationary brake carrier by way of guide bushings. The guide bushings are fastened to the brake carrier by screws and are arranged parallel to and at a distance from each other and form plain bearings. The brake caliper is retained in such a way that the brake caliper can be moved in a brake-application direction. The disc brake is designed in such a way that each guide bushing is wedged together with the associated screw.

12 Claims, 3 Drawing Sheets

(56) References Cited

U.S. PATENT DOCUMENTS

| | | |
|---|---|---|
| 4,334,599 A | 6/1982 | Ritsema et al. |
| 4,351,421 A | 9/1982 | Kurata et al. |
| 5,439,078 A * | 8/1995 | Baumgartner ........ F16D 55/227 188/217 |
| 2008/0029356 A1 | 2/2008 | Halasy-Wimmer et al. |
| 2009/0260928 A1 | 10/2009 | Baumgartner et al. |

FOREIGN PATENT DOCUMENTS

| | | |
|---|---|---|
| DE | 29 05 385 A1 | 8/1980 |
| DE | 30 30 098 A1 | 3/1981 |
| DE | 31 46 790 A1 | 8/1982 |
| DE | 101 43 805 A1 | 4/2003 |
| DE | 101 50 214 A1 | 4/2003 |
| DE | 102 42 102 A1 | 3/2004 |
| DE | 10 2005 003 770 B3 | 7/2006 |
| DE | 101 43 805 B4 | 10/2006 |
| DE | 10 2006 050 647 A1 | 4/2008 |
| EP | 1 844 247 B1 | 10/2003 |
| EP | 2 128 475 A1 | 12/2009 |

OTHER PUBLICATIONS

International Search Report (PCT/ISA/210) dated Jan. 17, 2014, with English translation (four (4) pages).
German Examination Report dated Apr. 4, 2013 (seven (7) pages).

* cited by examiner

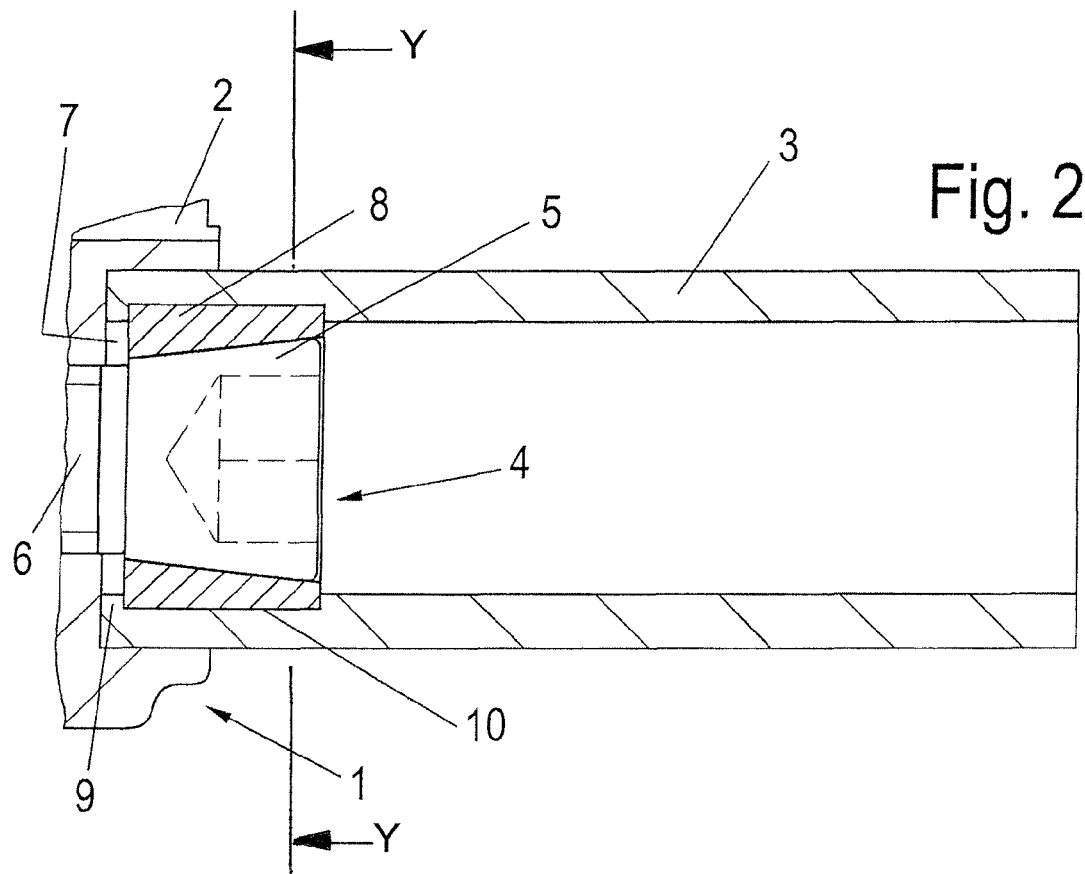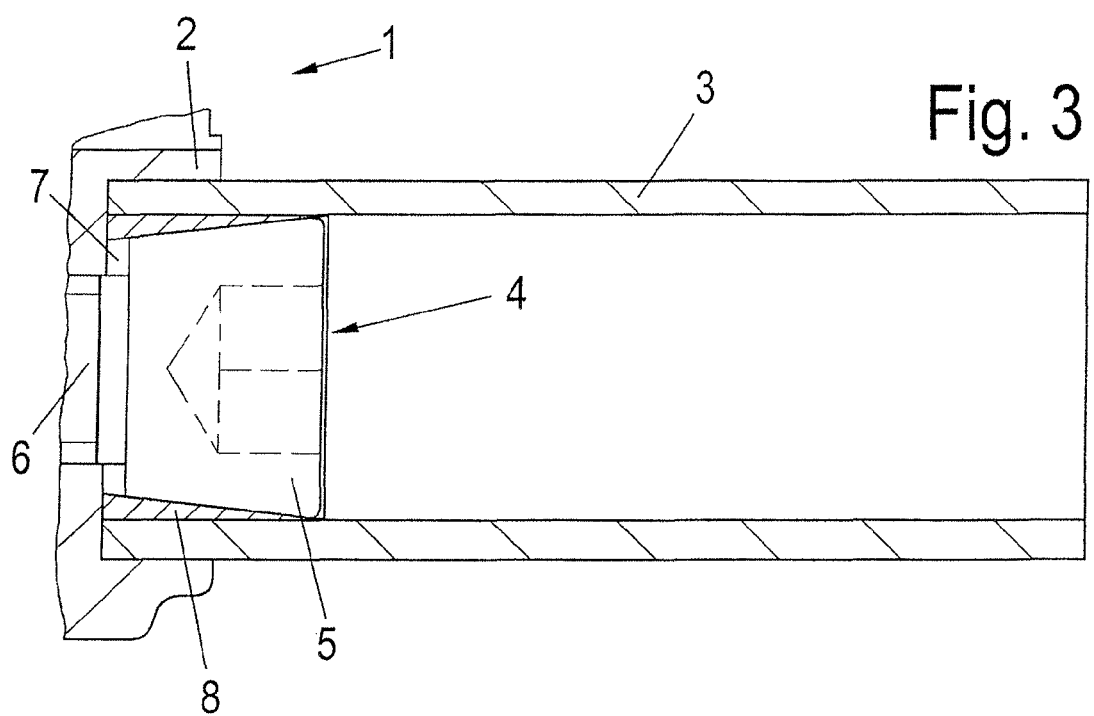

DISC BRAKE FOR A COMMERCIAL VEHICLE

CROSS REFERENCE TO RELATED APPLICATIONS

This application is a continuation of PCT International Application No. PCT/EP2013/064658, filed Jul. 11, 2013, which claims priority under 35 U.S.C. §119 from German Patent Application No. 10 2012 013 957.8, filed Jul. 13, 2012, the entire disclosures of which are herein expressly incorporated by reference.

BACKGROUND AND SUMMARY OF THE INVENTION

The invention relates to a disc brake for a commercial vehicle, having a brake caliper which straddles a brake disc and is held on a stationary brake carrier such that it can be displaced in the brake application direction by way of guide bushings fastened to the brake carrier via screws.

In disc brakes of this type, which are also called sliding caliper brakes, the brake caliper is connected to a stationary brake carrier which is fastened to the vehicle. To this end, guide bushings are fastened to the brake carrier by use of screws and form plain bearings together with sliding bushings which are arranged in the brake caliper. The guide bushings are guided in the sliding bushings in such a way that an axial displacement of the brake caliper relative to the brake carrier is possible.

The guide bushing is manufactured from solid material, principally a round steel, and is machined with the removal of material, a small collar being formed on the end side which faces the brake carrier. This small collar is inserted into a stepped bore, adapted thereto, of the brake carrier, as a result of which centering of the guide bushing is achieved.

The centric middle hole of the stepped bore has a thread, into which the screw is screwed, which is guided with its shank through the bushing. The head of the screw is supported on the opposite side of the guide bushing. Here, a cheese head screw with a hexagon socket is preferably used, which cheese head screw is supported with its head on the bottom of the first step of the through hole of the guide bushing, which through hole is likewise configured as a stepped bore.

In addition to the above-mentioned material-removing forming of the small collar and the introduction of the through hole, the circumferential face of the guide bushing has to be prepared for functioning as a plain bearing, for example by way of grinding and/or thermal treatment in the case of a hardened embodiment.

Of the two plain bearings, one is configured as a locating bearing and the other is configured as a floating bearing in order to compensate for manufacturing-induced tolerances. This requires a multiplicity of variants of guide bushings and also a corresponding number of different screws.

This naturally leads to considerable manufacturing and/or stock keeping outlay with the resultant cost disadvantages which oppose an optimization of costs, as is always aimed for precisely in the case of series-produced products.

The invention is based on the object of developing a disc brake of the above-mentioned type in such a way that it can be manufactured and assembled less expensively using structurally simple means.

This and other objects are achieved by way of a disc brake for a commercial vehicle, having a brake caliper which straddles a brake disc and is held on a stationary brake carrier such that it can be displaced in the brake application direction by way of guide bushings fastened to the brake carrier via screws. The guide bushing are arranged parallel to and at a spacing from one another and form plain bearings, wherein each guide bushing is wedged with the associated screw. In this way, a disc brake is produced which can certainly be manufactured considerably less expensively than the known disc brakes.

First of all, a standardized, preferably seamless steel tube which is suitable for material-removing machining and thermal treatment can be used as a guide bushing.

The omission of the introduction of a through hole into the guide bushing results not only in manufacturing advantages, but also in a saving of material.

The wedging, provided according to the invention, of the guide bushing with the screw makes it possible to use identical screws for the different uses, which likewise contributes to an optimization of costs, such as just one embodiment for all guide bushings. In particular, stock keeping both of screws and guide bushings is simplified considerably.

The semifinished product of the guide bushing, which is present as a tube, can be dimensioned in such a way that hardening followed by thermal treatment and subsequent grinding of the circumferential face within the predefined low tolerances are possible.

The wedging of the guide bushing on the screw preferably takes place by way of a wedge sleeve, with an inner face which rises in the screwing direction, whereas the outer circumferential face, which bears against the inner wall of the guide bushing, is kept cylindrical.

In order to produce the wedging action, that is to say in order to spread open the wedge sleeve, the latter is slotted continuously in the axial direction, the head of the screw, which head is adapted to the oblique face of the inner face of the wedge sleeve at least over a partial height, ensuring a spreading and wedging action with the guide bushing when screwed in.

According to a further aspect of the invention, the wedge sleeve is rolled as a sheet metal part from a strip and is either pressed into the guide bushing or is placed into it with play.

Depending on the design of the taper ratio between the head of the screw and the wedge sleeve, a self-securing clamping action is achieved. This leads to a radial expansion of the guide bushing when a defined radial clamping force is achieved. As a result, pressing onto the wall of the receiving bore of the brake carrier takes place, in which receiving bore the guide bushing lies on the end side.

According to one variant of the invention, the guide bushing can have a radially inwardly drawn circumferential collar in the end side region which faces the brake carrier as an axial abutment, on which the wedge sleeve is supported.

According to another embodiment, the abutment is formed by the bottom of the brake carrier-side stepped bore, in the first step of which the guide bushing lies. In this case, the wedge sleeve is pressed into the guide bushing, with the result that a captive securing means is produced which affords assembly advantages.

Since the wedge sleeve is arranged in the connecting region with the brake carrier, and accordingly the head of the screw is also positioned here, the screw can be kept considerably shorter than one according to the prior art, which likewise has a cost-reducing effect.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 2 and 3 show, in each case, one exemplary embodiment of the invention in a longitudinal section, corresponding to the line X-X in FIG. 1.

DETAILED DESCRIPTION OF THE DRAWINGS

Figure 1:
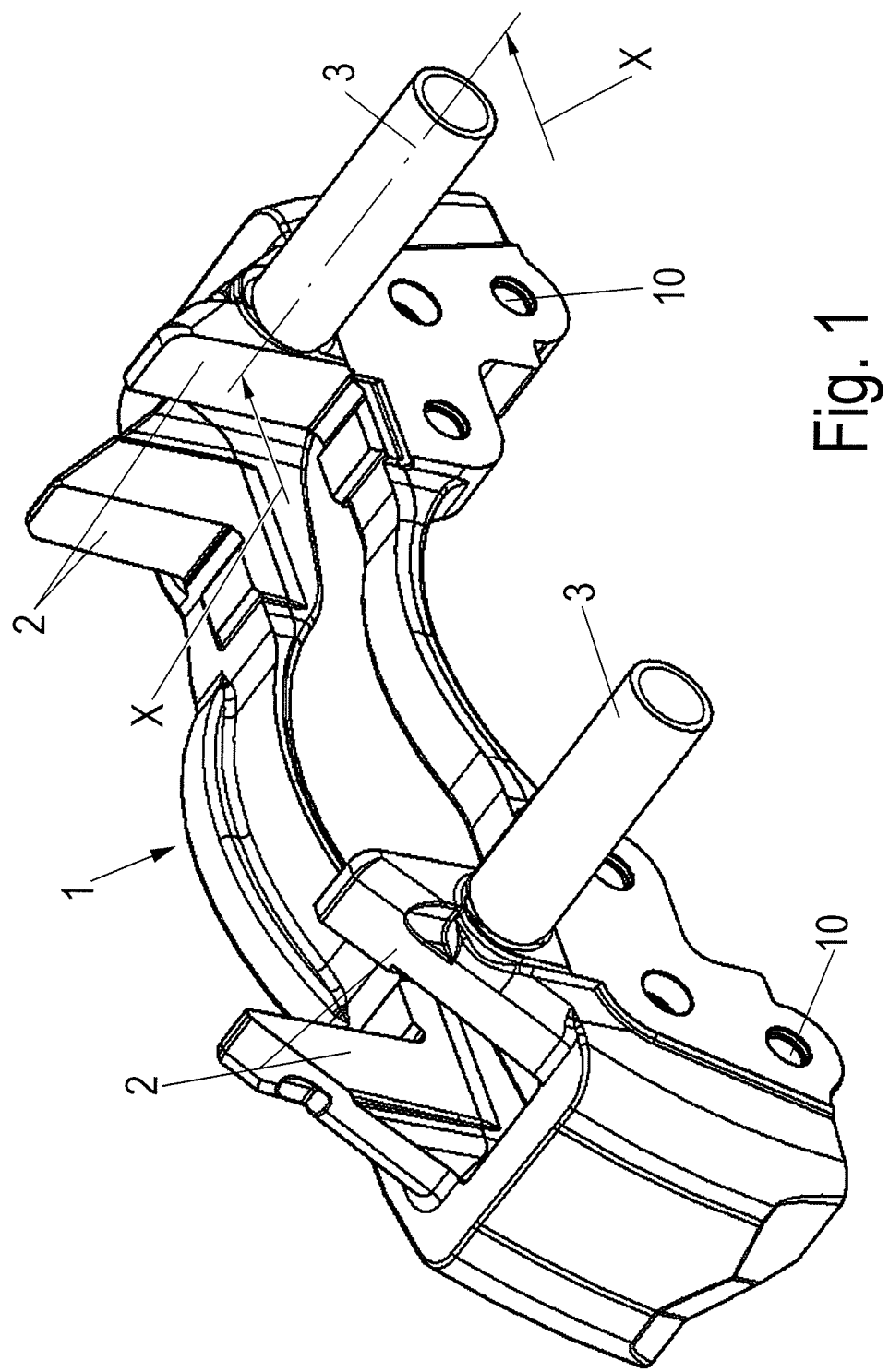
FIG. 1 is a perspective view of a brake carrier of a disc brake according to an embodiment of the invention.

FIG. 1 shows a brake carrier 1 of a disc brake for a commercial vehicle, which brake carrier 1 can be connected fixedly to the vehicle, to which end through holes 10 for connecting screws are provided.

The brake carrier 1 has two lining wells (pad shafts) which are delimited in each case by brake carrier lugs 2 which lie opposite one another and form a support for brake pads. The brake pads (not shown) come into contact on both sides with a brake disc (also not shown) in the case of a braking operation, in order to absorb braking moments which occur.

In each case, one guide bushing 3 is fastened by way of screws 4 (FIGS. 2 and 3) to the brake carrier lugs 2 of a lining well. The guide bushings 3, which are arranged parallel to and at a spacing from one another, are plugged in each case into a stepped bore 7 of the brake carrier 1, in the middle bore of which (with a thread) the screw 4 is screwed by way of a shank 6.

According to an embodiment of the invention, each guide bushing 3 is wedged into the carrier bore with the associated screw 4. To this end, a wedge sleeve 8 is provided in that end region of the guide bushing 3 which faces the brake carrier 1, with an inner concentric wedge face which rises in the screwing-in direction of the screw 4 and on which the head 5 of the screw 4 is supported. The screw head 5 is adapted to the concentric wedge face, that is to say is configured as a truncated cone.

Figure 2A:
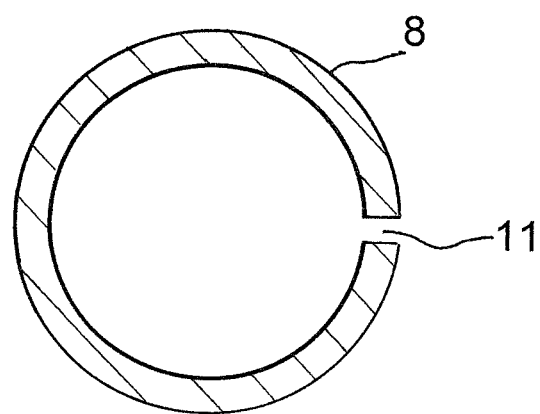
FIG. 2A shows an axial cross-section view of the wedge sleeve of FIG. 2 corresponding to the line Y-Y.

In the exemplary embodiment which is shown in FIG. 2, the guide bushing 3 bears with a radially inwardly drawn circumferential collar 9 on the end side against the bottom of the first step of the stepped bore 7. The circumferential collar 9 at the same time forms an abutment for the wedge sleeve 8 during screwing in of the screw 4 and, induced thereby, spreading of the wedge sleeve 8 which is otherwise slotted continuously in the axial direction (in FIG. 2A, slot 11) in order to achieve the spreading action.

The wedge sleeve 8 lies in an undercut section 10 of the inner bore of the guide bushing 3, with the result that the external diameter of the wedge sleeve 8 is greater than the inner diameter of the inner bore, whereas the greatest diameter of the head 5 is somewhat smaller than the inner diameter of the inner bore. This design variant can be manufactured particularly inexpensively, since merely the undercut region has to be machined.

Whereas the wedge sleeve 8 is arranged in the guide bushing 3 with a certain, if small amount of play in this example, the wedge sleeve 8 is pressed into the guide bushing 3 in the variant which is shown in FIG. 3. Here, the wedge sleeve 8 bears with its one end side against the bottom of the first step of the stepped bore 7, which bottom therefore forms an abutment for the wedge sleeve 8 during its bracing.

In order to achieve a largely homogeneous action, that is to say a largely homogeneous contact pressure of the cylindrical outer circumferential face of the wedge sleeve 8 on the inner wall of the guide bushing 3, the height of the head 5 of the screw 4 corresponds approximately to the axial length of the wedge sleeve 8 or is slightly shorter.

A tool receptacle, a hexagon socket in the example, into which a tool wrench can engage, which is introduced from the free end of the guide bushing 3, is let into the head 5 in order to turn the screw 4.

The diameter of the first step of the stepped bore 7 preferably corresponds to the external diameter of the guide bushing 3, with the result that the guide bushing 3 is expanded radially to such an extent, in the case of sufficient bracing of the wedge sleeve 8, that the guide bushing 3 bears under pressure against the wall of the stepped bore 7; this can be realized readily, in particular, in the example which is shown in FIG. 3.

LIST OF DESIGNATIONS

1 Brake carrier
2 Brake carrier lugs
3 Guide bushing
4 Screw
5 Head
6 Shank
7 Stepped bore
8 Wedge sleeve
9 Collar
10 Undercut section
11 Slot The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a commercial vehicle, the disc brake having a caliper which, in use, straddles a brake disk, comprising:
    a stationary brake carrier;
    guide bushings fastened to the brake carrier via screws, the guide bushings being arranged parallel and spaced apart from one another, wherein the caliper is mounted on the stationary brake carrier via the guide bushings so as to be displaceable in a brake application direction, and
    wherein
    each guide bushing is wedged against the brake carrier by an associated screw,
    a wedge sleeve arranged between the screw and the associated guide bushing, the wedge sleeve having a wedge face that rises in a screwing-in direction of the screw, and
    a cylindrical outer circumferential face of the wedge sleeve is supported on an inner side of the guide bushing, and further wherein an inner face of the wedge sleeve is configured as the wedge face against which bears a head of the screw.

2. The disc brake according to claim 1, wherein the guide bushing is formed from a seamless tube.

3. The disc brake according to claim 1, wherein the wedge sleeve comprises a continuous axial slot.

4. The disc brake according to claim 3, wherein the wedge sleeve is formed from a rolled metal sheet, edges of which facing one another delimit the continuous axial slot by being arranged spaced apart from one another.

5. The disc brake according to claim 1, wherein the wedge sleeve is pressed into the guide bushing.

6. The disc brake according to claim 1, wherein the wedge sleeve is arranged in the guide bushing with a small amount of play.

7. The disc brake according to claim 1, wherein the wedge sleeve is positioned on an end region of the guide bushing facing the brake carrier.

8. The disc brake according to claim 1, wherein a gradient angle of the wedge face, and of the head of the screw bearing against the wedge face, are configured for a self-locking action.

9. The disc brake according to claim 1, wherein:
the stationary brake carrier has stepped bores into which the guide bushings are fastened, and
the wedge sleeve is supported on a bottom of a first step of the stepped bore.

10. The disc brake according to claim 1, wherein:
the stationary brake carrier has stepped bores into which the guide bushings are fastened, and
the wedge sleeve is supported on a radially inwardly directed circumferential collar of the guide bushing, which collar rests on a bottom of a first step of the stepped bore.

11. The disc brake according to claim 1, wherein the wedge sleeve lies in an undercut section of the guide bushing, a diameter of the undercut section being greater than an inner diameter of the guide bushing.

12. The disc brake according to claim 1, wherein a height of a conical face of the head of the screw corresponds approximately to a height of the wedge sleeve.

\* \* \* \* \*